United States Patent
He et al.

(10) Patent No.: US 10,005,926 B2
(45) Date of Patent: Jun. 26, 2018

(54) SEWING-FREE HOT MELT ADHESIVE TPU LEATHER AND PREPARATION METHOD THEREOF

(71) Applicant: DONGGUAN XIONGLIN NEW MATERIAL TECHNOLOGY CO., LTD., Guangdong (CN)

(72) Inventors: Jianxiong He, Guangdong (CN); Yiliang Wang, Guangdong (CN)

(73) Assignee: DONGGUAN XIONGLIN NEW MATERIAL TECHNOLOGY CO., LTD, Guangdong (CN)

( * ) Notice: Subject to any disclaimer, the term of this patent is extended or adjusted under 35 U.S.C. 154(b) by 346 days.

(21) Appl. No.: 14/655,952

(22) PCT Filed: Jun. 9, 2014

(86) PCT No.: PCT/CN2014/079496
§ 371 (c)(1),
(2) Date: Jun. 26, 2015

(87) PCT Pub. No.: WO2015/021813
PCT Pub. Date: Feb. 19, 2015

(65) Prior Publication Data
US 2016/0215174 A1    Jul. 28, 2016

(30) Foreign Application Priority Data
Aug. 16, 2013    (CN) .......................... 2013 1 0359652

(51) Int. Cl.
*C09J 7/02* (2006.01)
*C09J 175/04* (2006.01)
(Continued)

(52) U.S. Cl.
CPC ......... *C09J 7/0282* (2013.01); *B29C 47/0021* (2013.01); *B32B 7/06* (2013.01); *B32B 7/12* (2013.01); *B32B 27/08* (2013.01); *B32B 27/10* (2013.01); *B32B 27/18* (2013.01); *B32B 27/20* (2013.01); *B32B 27/36* (2013.01); *B32B 27/40* (2013.01); *B32B 37/10* (2013.01); *B32B 37/1207* (2013.01); *B32B 37/26* (2013.01); *C08G 18/10* (2013.01); *C08G 18/12* (2013.01); *C08G 18/1833* (2013.01); *C08G 18/3206* (2013.01); *C08G 18/4213* (2013.01); *C08G 18/4216* (2013.01); *C08G 18/4854* (2013.01); *C08G 18/73* (2013.01); *C08G 18/751* (2013.01); *C08G 18/7671* (2013.01); *C09J 7/25* (2018.01); *C09J 7/403* (2018.01); *C09J 175/04* (2013.01); *D21H 27/001* (2013.01); *B29K 2075/00* (2013.01); *B29L 2007/008* (2013.01); *B32B 2037/1215* (2013.01); *B32B 2037/268* (2013.01); *B32B 2255/04* (2013.01); *B32B 2255/10* (2013.01); *B32B 2255/20* (2013.01); *B32B 2255/26* (2013.01); *B32B 2264/10* (2013.01); *B32B 2307/21* (2013.01); *B32B 2307/3065* (2013.01); *B32B 2307/714* (2013.01); *B32B 2437/00* (2013.01); *B32B 2437/02* (2013.01); *B32B 2439/00* (2013.01); *B32B 2479/00* (2013.01); *C08G 2170/20* (2013.01); *C09J 175/06* (2013.01);
(Continued)

(58) Field of Classification Search
None
See application file for complete search history.

(56) References Cited

U.S. PATENT DOCUMENTS

| | | | | |
|---|---|---|---|---|
| 4,734,310 A | * | 3/1988 | Briat | ...................... C08G 18/10 156/331.4 |
| 2002/0120088 A1 | * | 8/2002 | Hellwig | ................. C08G 18/12 528/44 |

(Continued)

FOREIGN PATENT DOCUMENTS

| CN | 101914353 | 12/2010 |
|---|---|---|
| CN | 102029764 | 4/2011 |

(Continued)

OTHER PUBLICATIONS

"Shore (Durometer) hardness test", MicroCoat Technologies, retrived on Aug. 2, 2017.*

(Continued)

*Primary Examiner* — Anish Desai
(74) *Attorney, Agent, or Firm* — Workman Nydegger (57) ABSTRACT

The present invention provides a novel sewing-free hot melt adhesive TPU leather and a preparation method thereof. The hot melt adhesive TPU leather comprises a release paper, a hot melt adhesive film, and a TPU film. The release paper comprises a bottom paper layer, an adhesive layer, a plastic layer, a transition layer, and a release layer; a hot melt adhesive raw material comprises polyester polyol, diisocyanate, polyether polyol, and a plurality of additives; and a TPU raw material comprises polymer polyol, 1,4-cyclohexane-diisocyanate, a chain extender, and a plurality of functional additives. According to the present invention, innovations are conducted on raw material components of the release paper, the hot melt adhesive, and the TPU film, and extrusion shaping is conducted by utilizing the hot melt adhesive with strong plasticity and the TPU thin film; and the prepared sewing-free TPU leather has the technical advantages of firm adhesion, durability, environmentally-friendly materials, no invisible harm to human body, and the like.

14 Claims, 1 Drawing Sheet

(51) Int. Cl.

| | | |
|---|---|---|
| *C08G 18/73* | (2006.01) | |
| *C08G 18/76* | (2006.01) | |
| *C08G 18/42* | (2006.01) | |
| *D21H 27/00* | (2006.01) | |
| *B29C 47/00* | (2006.01) | |
| *B32B 7/06* | (2006.01) | |
| *B32B 7/12* | (2006.01) | |
| *B32B 27/08* | (2006.01) | |
| *B32B 27/10* | (2006.01) | |
| *B32B 27/18* | (2006.01) | |
| *B32B 27/20* | (2006.01) | |
| *B32B 27/36* | (2006.01) | |
| *B32B 27/40* | (2006.01) | |
| *B32B 37/10* | (2006.01) | |
| *B32B 37/12* | (2006.01) | |
| *B32B 37/26* | (2006.01) | |
| *C08G 18/48* | (2006.01) | |
| *C08G 18/75* | (2006.01) | |
| *C08G 18/10* | (2006.01) | |
| *C08G 18/12* | (2006.01) | |
| *C08G 18/18* | (2006.01) | |
| *C08G 18/32* | (2006.01) | |
| *C09J 7/40* | (2018.01) | |
| *C09J 7/25* | (2018.01) | |
| *B29K 75/00* | (2006.01) | |
| *B29L 7/00* | (2006.01) | |
| *C09J 175/06* | (2006.01) | |

(52) U.S. Cl.
CPC ...... *C09J 2201/61* (2013.01); *C09J 2205/102* (2013.01); *C09J 2400/28* (2013.01); *C09J 2423/103* (2013.01); *C09J 2475/00* (2013.01); *C09J 2475/006* (2013.01)

(56) References Cited

U.S. PATENT DOCUMENTS

2009/0208759 A1* 8/2009 Kanagawa ............... B32B 5/26
   428/423.7
2016/0273159 A1* 9/2016 Feng .................... D06N 3/0043

FOREIGN PATENT DOCUMENTS

| CN | 102493216 | 6/2012 |
| JP | 2005186516 | 7/2005 |
| WO | WO2013027489 | 2/2013 |

OTHER PUBLICATIONS

Jianxiong, He et al. "Novel TPU (Thermoplastic Polyurethanes) Film", Machine translation of CN 102029764A, published on Apr. 27, 2011.*

Qishu Li et al. "TPU Leather and Preparation Method Thereof", Machine translation of CN 102493216A, published on Jun. 13, 2012.*

Jianxiong, He et al. "Polyurethane (PU) Artificial Leather Attached With Thermoplastic Polyurethane (TPU) Film", Machine translation of CN 202247487 U, published on May 30, 2012.*

Jinfeng, Li et al., "Aluminum Foil Tape With Lining Film and Manufacturing Method Thereof", English translation of CN 101914353A, published on Dec. 15, 2010.*

International Search Report cited in PCT Application No. PCT/CN2014/079496 dated Sep. 22, 2014.

* cited by examiner

SEWING-FREE HOT MELT ADHESIVE TPU LEATHER AND PREPARATION METHOD THEREOF

TECHNICAL FIELD

The present invention relates to the technical field of leather materials, more specifically relates to a sewing-free hot melt adhesive thermoplastic polyurethane (TPU) leather and a preparation method thereof.

BACKGROUND ART

In the production industries of clothing manufacture, shoemaking, bags and suitcases, handbags, seats, military industry in China and foreign countries, the lining adhered to all products is connected by the conventional sewing way in the prior art. Such production way has high work intensity and high production cost. Due to exogenic action, the product seams are easy to break, tear and peel, so as to severely affect the service life and quality of the product and obviously increase the consumption cost. Currently, most of the product linings are polyvinyl chloride (PVC) leather. PVC materials contain toxic essences such as polyvinyl chloride and ethylhexylamine which are carcinogenic and unsafe in use. Moreover, most of the glues used in the leather attachment of the prior art are industrial liquid glues, solid glues and polyurethane (PU) glues. Most of these melt adhesives are toxic and have a certain defect at the performance aspects, such as elasticity, acid-resistance, alkali-resistance, water washing resistance, dry-cleaning resistance, tension stress, adhesion and the like, so that they are not ideal environmentally-friendly adhesive materials.

CONTENTS OF THE INVENTION

On the basis of the aforesaid technical problems, the present invention provides a novel sewing-free hot melt adhesive thermoplastic polyurethane (TPU) leather and a preparation method thereof. According to the present invention, innovations are conducted on raw material components of the hot melt adhesive and the TPU film, and extrusion shaping is conducted by utilizing the hot melt adhesive with strong plasticity and the TPU thin film in combination with the long-term production experiences, to obtain the sewing-free TPU leather of the present invention. The sewing-free TPU leather of the present invention can directly fit various articles, and has the technical advantages of firm adhesion, durability, environmentally-friendly materials, no invisible harm to human body and the like. The present invention fundamentally solves the sewing connection and various bad factors brought by the current industrial adhesive to the leather product application.

The present invention solves the aforesaid technical problems by the following technical solution.

The present invention relates to a sewing-free hot melt adhesive TPU leather, characterized in comprising a release paper, a hot melt adhesive film coated on the release paper, and a TPU film adhered to the hot melt adhesive film, wherein the release paper comprises a bottom paper layer A1, an adhesive layer A2, a plastic layer A3, a transition layer A4 and a release layer A5; the plastic layer A3 is adhered to the bottom paper layer A1 via the adhesive layer A2; the transition layer A4 is placed on the plastic layer A3; the release layer A5 is placed on the transition layer A4; the adhesive layer A2 is a water-based polypropylene coating layer having an application amount of 5-8 g per square meter and a thickness of 0.8-4 μm; the plastic layer A3 is a polyethylene terephthalate film having a thickness of 18-25 μm; the transition layer A4 is prepared by mixing and stirring from 62 to 68 parts by weight of inorganic particles, from 32 to 36 parts by weight of silicone acrylic emulsion, from 3 to 5 parts by weight of sodium fatty acid methyl ester sulfonate, from 2 to 4 parts by weight of dodecyl benzyl dimethyl ammonium chloride, from 45 to 55 parts by weight of water, and has a film formation thickness of 15-20 μm; the release layer A5 has a thickness of 20-25 μm and is prepared by mixing and stirring from 58 to 65 parts by weight of polypropylene, from 26 to 34 parts by weight of poly(4-methyl-1-pentene), from 6 to 9 parts by weight of vinyl silicone oil, from 1 to 2 parts by weight of 2,2'-methylene-bi-(4,6-di-tertiary-butylphenoxy) sodium phosphate and from 0.1 to 0.8 part by weight of tert-butyl peroxy benzoate; wherein the hot melt adhesive material is prepared by from 60 to 70 parts by weight of polyester polyol, from 15 to 20 parts by weight of diisocyanate, from 3 to 5 parts by weight of polyether polyol, from 0.8 to 1.5 parts by weight of a catalyst, from 0.5 to 1.2 parts by weight of a chain extender, from 1.5 to 1.8 parts by weight of an antioxidant, from 4 to 6 parts by weight of a tackifying resin, from 2 to 4 parts by weight of a flame retardant, and from 2 to 4 parts by weight of a flexibilizer; the polyester polyol is polycondensed at 100-260° C. via aliphatic diol having a low molecular weight and aliphatic dicarboxylic acid and aromatic dicarboxylic acid to prepare hydroxyl-terminated polyester diol having a molecular weight of from 2000 to 6000; the aliphatic dicarboxylic acid is selected from the group consisting of adipic acid, fumaric acid, maleic acid or octanedioic acid; the aromatic dicarboxylic acid is selected from the group consisting of phthalic acid, terephthalic acid or m-phthalic acid; the aliphatic diol is selected from the group consisting of glycol, diglycol, propanediol, methyl propanediol, 1,4-butanediol, 1,6-hexanediol, 1,3-butanediol, 1,5-pentadiol or dodecyl hexandiol; the diisocyanate is selected from the group consisting of 4,4'-diphenylmethane diisocyanate or 1,6-hexamethylene diisocyanate; the polyether polyol is selected from the group consisting of polytetrahydrofuranether diol or propylene oxide co-polydiol; the catalyst is one or more selected from the group consisting of dibutyltin dilaurate, triethanolamine or dimorpholinodiethylether; the chain extender is selected from the group consisting of 1,6-hexanediol, methyl propanediol or 1,4-butanediol; the antioxidant is selected from the group consisting of 2, 6-tert-butyl-4-methylphenol, or tetra{β-(3, 5-tert-butyl-4-hydroxylphenyl)propionic acid} pentaerythritol ester; the tackifying resin is one or more selected from the group consisting of polyethylene-vinyl acetate copolymer, hydroxyl-terminated thermoplastic polyester and hydrogenated rosin resin; the flame retardant comprises from 30 wt. % to 70 wt. % of polypropylene having a melt index of from 0.5 to 15.0 g/10 min, from 5 wt. % to 25 wt. % of polyethylene having a melt index of from 0.01 to 2.0 g/10 min, from 20 wt. % to 30 wt. % of at least one inorganic filler selected from the group consisting of powdery talc, kaolinite, sericite, silicon dioxide and diatomite, from 5 wt. % to 35 wt. % of an organic flame retardant halide selected from decabromodiphenyl ether, dodecachloro-dodecahydro-dimethano-oxacillin cyclooctenyl or mixtures thereof; the flexibilizer is formed by mixing and extruding polyethylene elastomer, linear polyethylene, polypropylene and anti-aging agent materials; wherein the TPU material for preparing the TPU film comprises from 60 to 70 parts by weight of polymer polyol which is one or more selected from polytetrahydrofuranether diol having a molecular weight of 1000 and polybutylene terephthalate polyol having a molecular weight of 3000, from 30 to 35 parts by weight of 1,4-cyclohexane diisocyanate, from 4 to 9 parts by weight of a chain extender which is 1,4-butanediol, from 3 to 5 parts by weight of a carbodiimide-like hydrolytic resistant agent, from 1 to 3 parts by weight of an organic halide flame retardant prepared by mixing decabromodiphenyl ethane having an average particle size of less than or equal to 4 μm with trace calcined silicon dioxide, from 1 to 2 parts by weight of a wear-resistant agent consisting of aromatic silicone oil, from 0.2 to 0.8 part by weight of an antioxidant which is at least one selected from the group consisting of β-(4-hydroxyl-3,5-di-t-butylphenyl)propionic acid N-octa-decanol ester, tetra{β-(3, 5-tert-butyl-4-hydroxylphenyl) propionic acid} pentaerythritol ester and di-[(2,4-di-t-butyl-phenyl) phosphorous acid] pentaerythritol ester, from 0.1 to 0.5 part by weight of di-(2,2,6,6-tetramethyl-4-piperidyl) sebacate hindered amine-like light stabilizer, from 0.2 to 0.6 part by weight of benzotriazole-like ultraviolet light absorber, from 0.4 to 0.8 part by weight of montan wax and/or erucamide wax lubricant, from 1 to 3 parts by weight of a matting agent consisting of calcium filler, from 0.5 to 1.2 parts by weight of an antistatic agent consisting of metal powder and conductive carbon black, and from 0.05 to 0.2 part by weight of a titanium catalyst or a bismuth catalyst.

Furthermore, the present invention relates to a hot melt adhesive TPU leather, wherein the inorganic particles in the transition paper of the release paper comprise clay having a particle size of 0.5 to 0.8 μm and in an amount of 25% of the whole amount of inorganic particles, barium sulfate powder having a particle size of 1 to 2 μm and in an amount of 60% of the whole amount of inorganic particles, and calcium carbonate powder having a particle size of 3 to 5 μm and in an amount of 15% of the whole amount of inorganic particles, wherein vinyl silicone oil in the release layer has the following structural formula:

wherein $R_1$ and $R_3$ are —$CH_3$; $R_2$ is —$CH=CH_2$; m ranges from 2000 to 3000; and n ranges from 3 to 6.

Furthermore, the present invention relates to a hot melt adhesive TPU leather, wherein the adhesive layer A2 has a thickness of 2.5 μm; the plastic layer A3 has a thickness of 20 μm; the transition layer A4 has a thickness of 15 μm; the release layer A5 has a thickness of 25 μm, wherein the transition layer is prepared from 65 parts by weight of inorganic particles, 35 parts by weight of silicone acrylic emulsion, 4 parts by weight of sodium fatty acid methyl ester sulfonate, 3 parts by weight of dodecyl benzyl dimethyl ammonium chloride, and 50 parts by weight of water; the release layer is prepared from 60 parts by weight of polypropylene, 30 parts by weight of poly(4-methyl-1-pentene), 8 parts by weight of vinyl silicone oil, 1.5 parts by weight of 2,2'-methylene-bi-(4,6-di-tertiary-butylphenoxy) sodium phosphate and 0.5 part by weight of tert-butyl peroxy benzoate, wherein the vinyl silicone oil has the following structural formula wherein $R_1$ and $R_3$ are —$CH_3$; $R_2$ is —$CH=CH_2$; m=2500; and n=4.

Furthermore, the present invention relates to a hot melt adhesive TPU leather, wherein the hot melt adhesive is prepared from 65 parts by weight of polyester polyol, 18 parts by weight of diisocyanate, 4 parts by weight of polyether polyol, 1 part by weight of a catalyst, 1 part by weight of a chain extender, 1.6 parts by weight of an antioxidant, 5 parts by weight of a tackifying resin, 3 parts by weight of a flame retardant, and 3 parts by weight of a flexibilizer, wherein the flexibilizer is formed by mixing and extruding 31 wt. % of polyethylene elastomer, 19 wt. % of linear polyethylene, 49 wt. % of polypropylene and 1 wt. % of an anti-aging agent; the flame retardant comprises 50 wt. % of polypropylene having a melt index of 5 g/10 min, 20 wt. % of polyethylene having a melt index of 0.8 g/10 min, 20 wt. % of inorganic filler formed by mixing powdery talc and kaolinite, and 10 wt. % of organic flame retardant halide formed by mixing decabromodiphenyl ether and dode-cachloro-dodecahydro-dimethano-oxacillin cyclooctenyl.

Furthermore, the present invention relates to a hot melt adhesive TPU leather, wherein the TPU material comprises 65 parts by weight of polybutylene terephthalate polyol having a molecular weight of 3000, 0.6 part by weight of β-(4-hydroxyl-3,5-di-t-butylphenyl)-propionic acid N-octa-decanol ester antioxidant, 0.3 part by weight of di-(2,2,6,6-tetramethyl-4-piperidyl) sebacate light stabilizer, 0.4 part by weight of benzotriazole-like ultraviolet light absorber, 0.6 part by weight of erucamide wax lubricant, 4 parts by weight of carbodiimide-like hydrolytic resistant agent, 32 parts by weight of 1,4-cyclohexane diisocyanate at a temperature of 60° C., 6 parts by weight of 1,4-butanediol chain extender, 0.1 part by weight of a bismuth catalyst, 2 parts by weight of an organic halide flame retardant prepared by mixing decabromodiphenyl ethane with trace calcined silicon dioxide, 1.5 parts by weight of a wear-resistant agent consisting of aromatic silicone oil, 2 parts by weight of a matting agent consisting of calcium filler and 0.8 part by weight of an antistatic agent consisting of conductive carbon black.

The hot melt adhesive TPU leather according to the present invention has a tensile strength of 28.2 Kgf horizontally and 25.3 Kgf longitudinally, a tear strength of 5.0 Kgf warp-wise and 4.7 Kgf weft-wise, a bonding strength of greater than or equal to 2.5 Kg/25 mm, an elongation rate of greater than or equal to 700%, and a Shore D harness of greater than or equal to 95.

The present invention relates to a method for preparing a sewing-free hot melt adhesive TPU leather, characterized in comprising the following steps, I. Preparing a Release Paper
   (1) choosing a bottom paper layer A1, coating a water-based polypropylene adhesive layer A2 having a thickness of 0.8-4 μm onto the bottom paper layer A1, then adhering a plastic layer A3 having a thickness of 18-25 μm and formed from polyethylene terephthalate film to the adhesive layer A2, and then curing for a certain time;
   (2) adding from 3 to 5 parts by weight of sodium fatty acid methyl ester sulfonate into from 45 to 55 parts by weight of water, stirring homogeneously, then adding from 62 to 68 parts by weight of inorganic particles formed by mixing clay, barium sulfate powder and calcium carbonate powder, stirring in a high-speed rate to disperse them homogeneously, then adding from 32 to 36 parts by weight of silicone acrylic emulsion into the dispersed slurry, homogeneously mixing with a glass rod, and then adding from 2 to 4 parts by weight of dodecyl benzyl dimethyl ammonium chloride, continuing to homogeneously stir to form a transition layer coating liquid;

(3) homogeneously coating the transition layer coating liquid on the plastic layer A3 with a scraper, heating at 80° C. for 30 seconds and curing to form a film, controlling the thickness of the film to be from 15 to 20 µm, press-polishing the film-formed transition layer A4 at 120° C., a linear pressure of 150 KN/m and a speed of 10 m/min;

(4) homogeneously mixing 58-65 parts by weight of polypropylene, 26-34 parts by weight of poly(4-methyl-1-pentylene) and from 6 to 9 parts by weight of vinyl silicone oil, heating to a temperature of 90° C., keeping the temperature for 2 hours, adding from 1 to 2 parts by weight of 2,2'-methylene-bis-(4,6-di-tertiary-butylphenoxy)sodium phosphate and from 0.1 to 0.8 part by weight of butyl peroxybenzoate, homogeneously mixing, extruding via an extruder and coating onto the surface of the transition layer A4 to form a release layer A5, controlling the thickness thereof to be from 20 to 25 µm;

II. Preparing Hot Melt Adhesive Material (1) placing from 60 to 70 parts by weight of polyester polyol, from 3 to 5 parts by weight of polyether polyol, from 1.5 to 1.8 parts by weight of an antioxidant and from 4 to 6 parts by weight of a tackifying agent in a reaction kettle, heating to a temperature of from 120 to 140° C., vacuum dehydrating for 1.5 to 2 h while stirring and mixing, wherein the vacuum degree is less than 0.05 MPa, then cooling to a temperature of from 70 to 75° C., wherein the polyester polyol is polycondensed at 100-260° C. via aliphatic diol having a low molecular weight and aliphatic dicarboxylic acid and aromatic dicarboxylic acid to prepare hydroxyl-terminated polyester diol having a molecular weight of from 2000 to 6000; the polyether polyol is selected from the group consisting of polytetrahydrofuranether diol or propylene oxide co-polydiol; the antioxidant is selected from the group consisting of 2,6-tert-butyl-4-methylphenol, or tetra{β-(3, 5-tert-butyl-4-hydroxylphenyl)-propionic acid} pentaerythritol ester; the tackifying resin is one or more selected from the group consisting of polyethylene-vinyl acetate copolymer, hydroxyl-terminated thermoplastic polyester and hydrogenated rosin resin;

(2) adding from 15 to 20 parts by weight of diisocyanate and from 0.8 to 1.5 parts by weight of a catalyst to the reaction product in step (1) under nitrogen protection, and reacting at a temperature of from 85 to 95° C. for 1 to 1.5 h, wherein said diisocyanate is either of 4,4'-diphenylmethane diisocyanate or 1,6-hexamethylene diisocyanate; the catalyst is one or more selected from the group consisting of dibutyltin dilaurate, triethanolamine and dimorpholinodiethylether;

(3) adding from 0.5 to 1.2 parts by weight of a chain extender, from 2 to 4 parts by weight of a flame retardant, from 2 to 4 parts by weight of a flexibilizer to the reaction product in step (2) under nitrogen protection, stirring and reacting at 75 to 85° C. for 45 min to 1 h, wherein the chain extender is one selected form the group consisting of 1,6-hexanediol, methylpropanediol and 1,4-butanediol; the flame retardant comprises polypropylene, polyethylene, inorganic filler, and organic flame retardant halide; the flexibilizer is selected from polyolefin flexibilizer;

(4) discharging under the protection condition of feeding nitrogen, aging, cooling to form hot melt adhesive material;

III. Preparing TPU Material (1) placing from 60 to 70 parts by weight of polymer polyol into a reaction kettle, and heating to a temperature of from 80 to 90° C., wherein the polymer polyol is polytetrahydrofuranether diol having a molecular weight of 1000 and/or polybutylene terephthalate polyol having a molecular weight of 3000, then adding from 0.2 to 0.8 part by weight of an antioxidant, from 0.1 to 0.5 part by weight of di-(2,2,6,6-tetramethyl-4-piperidyl) sebacate light stabilizer, from 0.2 to 0.6 part by weight of benzotriazole-like ultraviolet light absorber, from 0.4 to 0.8 part by weight of montan wax and/or erucamide wax lubricant, from 3 to 5 parts by weight of carbodiimide-like hydrolytic resistant agent, sufficiently stirring to obtain a polymer polyol mixed solution, wherein the antioxidant is at least one selected from the group consisting of β-(4-hydroxyl-3,5-di-t-butylphenyl)-propionic acid N-octadecanol ester, tetra{β-(3,5-di-butyl-4-hydroxylphenyl)propionic acid}-pentaerythritol ester and di-[(2,4-di-t-butyl-phenyl) phosphorous acid] pentaerythritol ester;

(2) adding from 30 to 35 parts by weight of 1,4-cyclohexane diisocyanate having a temperature of from 55 to 65° C. into the polymer polyol mixed solution, stirring and mixing to obtain a primary reaction mixture;

(3) keeping the temperature of said reaction mixture, adding from 4 to 9 parts by weight of 1,4-butanediol chain extender and from 0.05 to 0.2 part by weight of a titanium catalyst or a bismuth catalyst, controlling the temperature to be from 150 to 210° C. and the pressure to be from 4 to 8 MPa, and reacting for about 1 h;

(4) when the reaction melt reaches to a temperature between 180 to 210° C., adding from 1 to 3 parts by weight of an organic halide flame retardant having an average particle size of less than or equal to 4 µm and formed by mixing decabromodiphenyl ethane with trace calcined silicon dioxide, from 1 to 2 parts by weight of a wear-resistant agent consisting of aromatic silicone oil, from 1 to 3 parts by weight of a matting agent consisting of calcium filler and from 0.5 to 1.2 part by weight of an antistatic agent consisting of metal powder or conductive carbon black, dehydrating, drying and aging after reacting for a predefined time to obtain thermoplastic polyurethane elastomer material;

IV. Joint-Preparing Sewing-Free Hot Melt Adhesive TPU Leather (1) preparing the release paper, hot melt adhesive material and TPU material prepared by the aforesaid steps and spreading out the release paper in relevant devices;

(2) extruding the hot melt adhesive material prepared in step II via an extruder into sizing material, feeding the sizing material into an extruder at 150° C. and melting into a pasty form, extruding via the extruder die head and flow casting to the release paper, pressing via the counter roller, cooling and reeling to form a hot melt adhesive film;

(3) extruding the TPU material prepared in step III into TPU film, placing the hot melt adhesive film onto two feeding racks respectively, feeding the hot melt adhesive film and TPU film simultaneously into an upper and lower counter pressure rollers which are thermostatic for counter pressing, wherein the counter pressure rollers have a temperature of more than 160° C., so as to make the hot melt adhesive having a low melting point instantaneously bond to the TPU film into a whole one in the counter pressing of the upper and lower counter pressure rollers, and then be cooled and molded to the sewing-free hot melt adhesive TPU leather.

In the preparation method according to the present invention, in the step I for preparing the release paper, the transition layer is prepared from 65 parts by weight of inorganic particles, 35 parts by weight of silicone acrylic emulsion, 4 parts by weight of sodium fatty acid methyl ester sulfonate, 3 parts by weight of dodecyl benzyl dimethyl ammonium chloride and 50 parts by weight of water; the inorganic particles specifically comprise 25% of clay having a particle size of 0.5 to 0.8 μm, 60% of barium sulfate powder having a particle size of 1 to 2 μm, and 15% of calcium carbonate powder having a particle size of 3 to 5 μm; the release layer is prepared from 60 parts by weight of polypropylene, 30 parts by weight of poly-4-methyl-1-pentylene, 8 parts by weight of vinyl silicone oil, 1.5 parts by weight of 2,2'-methylene-bis-(4,6-di-tertiary-butylphenoxy)sodium phosphate and 0.5 part by weight of butyl peroxybenzoate, wherein the vinyl silicone oil has the following structural formula wherein $R_1$ and $R_3$ are —$CH_3$, and $R_2$ is —CH=$CH_2$; m=2500; and n=4.

In the preparation method according to the present invention, the aliphatic dicarboxylic acid for preparing polyester polyol in step II is selected from the group consisting of adipic acid, fumaric acid, maleic acid or octanedioic acid; the aromatic dicarboxylic acid is selected from the group consisting of phthalic acid, terephthalic acid or m-phthalic acid; the aliphatic diol is selected from the group consisting of glycol, diglycol, propanediol, methyl propanediol, 1,4-butanediol, 1,6-hexanediol, 1,3-butanediol, 1,5-pentadiol or dodecyl hexandiol; the flame retardant comprises from 30 wt. % to 70 wt. % of polypropylene having a melt index of from 0.5 to 15.0 g/10 min, from 5 wt. % to 25 wt. % of polyethylene having a melt index of from 0.01 to 2.0 g/10 min, from 20 wt. % to 30 wt. % of at least one inorganic filler selected from the group consisting of powdery talc, kaolinite, sericite, silicon dioxide and diatomite, from 5 wt. % to 35 wt. % of an organic flame retardant halide selected from decabromodiphenyl ether, dodecachloro-dodecahydro-dimethano-oxacillin cyclooctenyl and mixtures thereof; the flexibilizer is formed by mixing and extruding polyethylene elastomer, linear polyethylene, polypropylene and an anti-aging agent. The mass percents of the materials are: polyethylene elastomer: 31%, linear polyethylene: 19%, polypropylene: 49% and anti-aging agent: 1%.

In the preparation method according to the present invention, the TPU material in said step III comprises 65 parts by weight of polybutylene terephthalate polyol having a molecular weight of 3000, 0.6 part by weight of β-(4-hydroxyl-3,5-di-t-butylphenyl)-propionic acid N-octadecanol ester antioxidant, 0.3 part by weight of di-(2,2,6,6-tetramethyl-4-piperidyl) sebacate light stabilizer, 0.4 part by weight of benzotriazole-like ultraviolet light absorber, 0.6 part by weight of erucamide wax lubricant, 4 parts by weight of carbodiimide-like hydrolytic resistant agent, 32 parts by weight of 1,4-cyclohexane diisocyanate at a temperature of 60° C., 6 parts by weight of 1,4-butanediol chain extender, 0.1 part by weight of a bismuth catalyst, 2 parts by weight of an organic halide flame retardant prepared by mixing decabromodiphenyl ethane with trace calcined silicon dioxide, 1.5 parts by weight of a wear-resistant agent consisting of aromatic silicone oil, 2 parts by weight of a matting agent consisting of calcium filler and 0.8 part by weight of an antistatic agent consisting of conductive carbon black.

The present invention has the following main technical features and technical effects.

(1) Using innovative multilayered release paper, especially the innovative design of the multifunctional layer and release layer makes the release paper of the present invention have excellent physicochemical performances when applied in the leather product; having a high adhesive strength to hot melt adhesive and a short curing time; being ideal base materials in high quality leather.

(2) Using creative hot melt adhesive having a low melt point, which is an adhesive having a strong plasticity and can replace the industrial liquid glues, solid glues and PU glues, has the advantages of environmental protection, non-poisonous and no side effect; as ideal environmentally-friendly adhesive material, the hot melt adhesive of the present invention has the performances of low melt point, high elasticity, acid-resistance, alkali-resistance, water washing resistance, dry-cleaning resistance, strong tension stress, strong adhesion, and the like.

(3) By creative improvements on raw materials, the TPU film used therein overcomes many defects of the current TPU. It not only has most of the characteristics of rubber and common plastics, but also has excellent comprehensive physical and chemical performances. It can be used for replacing PVC, PU artificial leather and other leather linings.

(4) For the sewing-free TPU leather of the present invention, qualitative change will not occur even at a high temperature of 190° C. Said leather is very easy to adhere to the surfaces of the materials such as cloth materials, rubber and plastic leather, wood and the like, and can be widely used in the production and manufacturing industries such as clothing manufacture, shoemaking, bags and suitcases, handbags, seats, architectural ornament and the like. Moreover, the bonded product is water-resistant and dry-cleaning resistant, and has the performances of wear resistance, heat resistance and bend resistance. Upon SGS test, the hot melt adhesive and essences in the TPU material of the present invention has biomedical performance, no toxicity, no odour and no allergic reaction. Said environmentally-friendly product has no pollution, and is one of the extremely ideal environmentally-friendly laminating linings in the twenty-first century.

EMBODIMENTS

The technical solution of the present invention is detailedly described as follows to make those skilled in the art more clearly understand the solution, but the protection scope of the present invention will not be limited thereby. It should first be noted that the components of most of the raw materials in the present invention are weighed in "part(s) by weight". Such "part(s) by weight" merely refers to the amount percent (equal to mass percent) of the components inside each substance per se, and does not represent actual usage mass. That is to say, some components in different substances may have the same or close parts by weight, which does not mean that these components have the same or close mass percents in each substance.

First, the present invention describes the molded products of the sewing-free hot melt adhesive TPU leather, as well as the preparation method thereof. The sewing-free hot melt adhesive TPU leather of the present invention comprises a release paper, a hot melt adhesive film and a TPU film. The sewing-free hot melt adhesive TPU leather is prepared by laminating both sides, specifically comprising the following steps.

Step I: preparing release paper, hot melt adhesive material and TPU material, wherein these materials are original materials and one of the key inventive aspects of the present invention; the material formula and preparation methods thereof will be detailedly stated thereafter.

Figure 1:
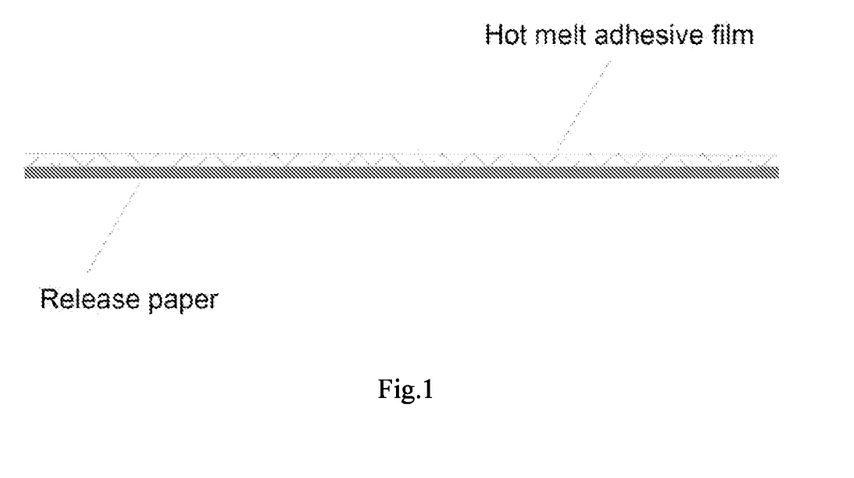
FIG. 1 shows a schematic diagram of extruding the hot melt adhesive of the present invention onto the release paper to form a hot melt adhesive film.

Step II: extruding the prepared hot melt adhesive material via an extruder and forming sizing material, feeding the sizing material into an extruder at 150° C. and melting into a pasty form, extruding via the extruder die head and flow casting to the release paper having isolation effect, pressing via the counter roller, cooling and reeling to form a sewing-free hot melt adhesive film as shown in FIG. 1.

Figure 2:
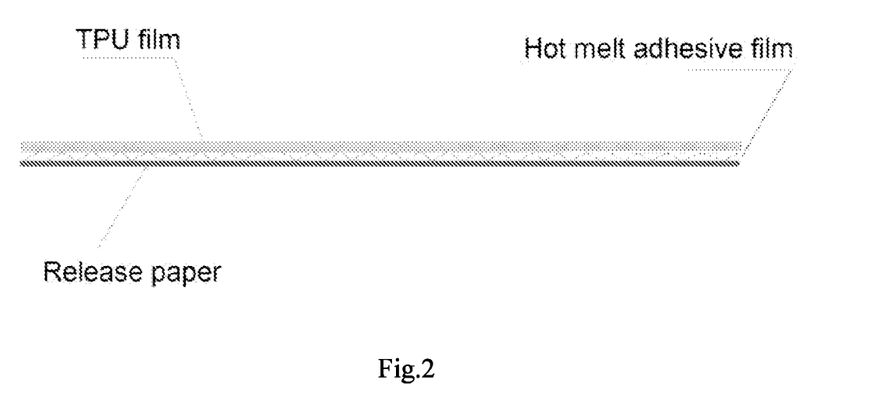
FIG. 2 shows a schematic diagram of press-fitting the hot melt adhesive film in FIG. 1 and the TPU film to the sewing-free hot melt adhesive TPU leather of the present invention.

Step III: extruding the prepared TPU material into TPU film, placing the volumed hot melt adhesive film and TPU film onto two feeding racks respectively, feeding the hot melt adhesive film and TPU film simultaneously into an upper and lower counter pressure rollers which are thermostatic for counter pressing, wherein the counter pressure rollers have a temperature of more than 160° C., so as to make the hot melt adhesive having a low melting point instantaneously bond to the TPU film into a whole one in the counter pressing of the upper and lower counter pressure rollers, and then be cooled and molded to the new sewing-free hot melt adhesive TPU leather material as shown in FIG. 2.

The key technologies of the present invention include the formula of the hot melt adhesive having a high viscosity, the key formula of the TPU film, the selections of various functional additives (master batch) therein, and the preparation of the release paper as base material. TPU (Thermoplastic polyurethane) and PU (Polyurethane) are environmentally friendly materials. Moreover, physical performances of PU material, such as different densities, elasticities and rigidities, can be obtained only by simply changing the formula, and PU material are better decoration material. By a mass of tests in combination with long term production practice, the present invention innovatively puts forwards a novel polyurethane hot melt adhesive and TPU material. By changing formula components and additives, in combination with mathematical models and practice verifications, and by collecting multiple groups of test data, the impact factors between the components are determined. The optimum proportion is calculated by theory, and applied to the tests. The products of the present invention obtained after verification have multiple better physical performances, such as adhesion, tear resistance, wear resistance, high thermal resistance and the like.

The release paper of the present invention has the following composition, and is prepared as follows.

Figure 3:
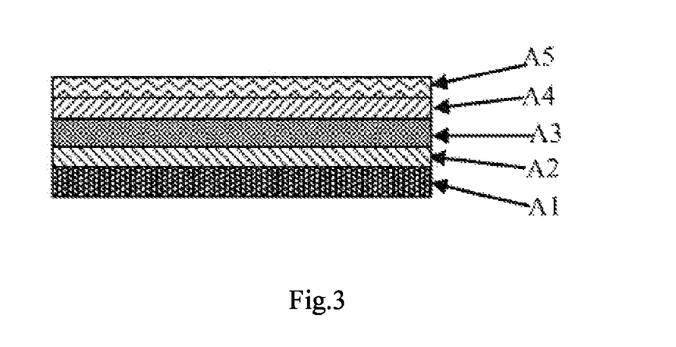
FIG. 3 shows a schematic diagram of the release paper applied in the present invention, wherein A1-bottom paper layer; A2-adhesive layer; A3-plastic layer; A4-transition layer; A5-release layer.

As shown in FIG. 3, the release paper of the present invention has a multilayered structure, specifically comprises a bottom paper layer A1, a plastic layer A3 bonded on the bottom paper layer A1 via an adhesive layer A2, a transition layer A4 on the plastic layer A3 and a release layer A5 on the transition layer A4. The plastic layer A3 as specifically stated is a polyethylene terephthalate film (i. e. PET film) having a thickness of 18-25 μm, preferably 20 μm. The adhesive layer A2 is adhered to the bottom paper layer A1 and polyethylene terephthalate film A3, and said adhesive layer A2 is a water-based polypropylene (PP) coating layer having an application amount of 5-8 g per square meter, preferably 6 g per square meter and a thickness of 0.8-4 μm, preferably 1-2.5 μm. The transition layer A4 comprises inorganic particles, silicone acrylic emulsion, sodium fatty acid methyl ester sulfonate, dodecyl benzyl dimethyl ammonium chloride and water, the weight parts of the components are: inorganic particles: 62-68 parts by weight, silicone acrylic emulsion: 32-36 parts by weight, sodium fatty acid methyl ester sulfonate: 3-5 parts by weight, dodecyl benzyl dimethyl ammonium chloride: 2-4 parts by weight and water: 45-55 parts by weight; wherein the inorganic particles comprise clay having a particle size of 0.5 to 0.8 μm and in an amount of 25% of the whole amount of inorganic particles, barium sulfate powder having a particle size of 1 to 2 μm and in an amount of 60% of the whole amount of inorganic particles, and calcium carbonate powder having a particle size of 3 to 5 μm and in an amount of 15% of the whole amount of inorganic particles. The transition layer A4 is prepared by adding sodium fatty acid methyl ester sulfonate in said parts by weight into water in said parts by weight, homogeneously stirring, homogeneously mixing clay, barium sulfate powder and calcium carbonate comprised in inorganic particles and adding to the stirred solution according to the aforesaid parts by weight, high-speed stirring and homogeneously dispersing, adding silicone acrylic emulsion in said parts by weight, homogeneously mixing with a glass rod, adding dodecyl benzyl dimethyl ammonium chloride in said parts by weight, continuing to homogeneously stir to form a transition layer coating solution. The transition layer coating solution is homogeneously coated on the plastic layer A3 with a scraper, heated at 80° C. for 30 seconds to cure to a film having a thickness of 15-20 μm. The film-formed transition layer A4 is press-polished at 120° C., a linear pressure of 150 KN/m and a speed of 10 m/min. The press-polishing reduces tiny holes in the transition layer so as to make the film layer smoother. As a result, a more compact and smoother surface state will be obtained to be advantageous to the laying of the release layer thereon. Moreover, the smooth surface of the transition layer makes the final release layer surface have a flatness of the mirror surface, so as to ensure the surface state and glossiness of the final leather product. The transition layer ensures that the whole release paper has anti-permeation and surface smoothness, and silicone acrylic emulsion therein can form a compact film after heating and curing so as to effectively hinder the solvent permeation to the paper base. The film formed from silicone acrylic emulsion has a good solvent resistance, and the application of the solvent thereon will not dissolve and destroy the film and other base materials. The transition layer effectively covers the roughness of the surfaces of the bottom paper layer A1 and the plastic layer A3, so as to ensure the smoothness of the release layer surface and the whole release paper. Such smoothness of the surface state of the release paper is advantageous to increase the smoothness and glossiness of the whole leather product based on the release paper. The release layer A5 on the transition layer A4 comprises from 58 to 65 parts by weight of polypropylene, from 26 to 34 parts by weight of poly(4-methyl-1-pentene), from 6 to 9 parts by weight of vinyl silicone oil, from 1 to 2 parts by weight of 2,2'-methylene-bi-(4,6-di-tertiary-butylphenoxy)sodium phosphate and from 0.1 to 0.8 part by weight of tert-butyl peroxy benzoate, wherein the vinyl silicone oil has the following structural formula:

wherein $R_1$ and $R_3$ are —$CH_3$; $R_2$ is —$CH=CH_2$; m ranges from 2000 to 3000; and n ranges from 3 to 6.

The release layer is prepared by homogeneously mixing polypropylene, poly(4-methyl-1-pentene) and vinyl silicone oil in the aforesaid respective parts by weight, heating to 90° C., keeping such temperature for 2 h, adding from 1 to 2 parts by weight of 2,2'-methylene-bi-(4,6-di-tertiary-butylphenoxy)sodium phosphate and from 0.1 to 0.8 part by weight of tert-butyl peroxy benzoate, homogeneously mixing, extruding via an extruder, coating on the surface of the transition layer A4, controlling the thickness of the release layer from 20 to 25 μm. In such release layer, 2,2'-methylene-bi-(4,6-di-tertiary-butylphenoxy)sodium phosphate and tert-butyl peroxy benzoate are used to speed up initiating the crosslinking reaction between double bonds of polyolefins and double bonds of vinyl silicone oil, wherein the polyolefin content is increasing. Since polyolefins have a better affinity to polyurethane, the leather products formed by adhering the release paper having such release layer to the hot melt adhesive containing polyurethane are not easy to peel off, so as to increase the product performance. The release paper of the present invention is obtained by such method, and is greatly suitable to the hot melt adhesive and the coating of TPU film layer of the present invention. Preferably, the release paper of the present invention has a thickness ranging from 80 to 100 μm. However, the thickness thereof is not limited thereto, and can be adjusted according to actual requirements.

The hot melt adhesive extruded onto the aforesaid release paper comprises from 60 to 70 parts by weight of polyester polyol, from 15 to 20 parts by weight of diisocyanate, from 3 to 5 parts by weight of polyether polyol, from 0.8 to 1.5 parts by weight of a catalyst, from 0.5 to 1.2 parts by weight of a chain extender, from 1.5 to 1.8 parts by weight of an antioxidant, from 4 to 6 parts by weight of a tackifying resin, from 2 to 4 parts by weight of a flame retardant, and from 2 to 4 parts by weight of a flexibilizer The polyester polyol is polycondensed at 100-260° C. via aliphatic diol having a low molecular weight and aliphatic dicarboxylic acid and aromatic dicarboxylic acid to prepare hydroxyl-terminated polyester diol having a molecular weight of from 2000 to 6000. The aliphatic dicarboxylic acid is selected from the group consisting of adipic acid, fumaric acid, maleic acid or octanedioic acid; the aromatic dicarboxylic acid is selected from the group consisting of phthalic acid, terephthalic acid or m-phthalic acid; the aliphatic diol is selected from the group consisting of glycol, diglycol, propanediol, methyl propanediol, 1,4-butanediol, 1,6-hexanediol, 1,3-butanediol, 1,5-pentadiol or dodecyl hexandiol.

The diisocyanate is selected from the group consisting of 4,4'-diphenylmethane diisocyanate or 1,6-hexamethylene diisocyanate.

The polyether polyol is selected from the group consisting of polytetrahydrofuranether diol or propylene oxide co-polydiol.

The catalyst is one or more selected from the group consisting of dibutyltin dilaurate, triethanolamine or dimorpholinodiethylether.

The chain extender is selected from the group consisting of 1,6-hexanediol, methyl propanediol or 1,4-butanediol.

The antioxidant is selected from the group consisting of 2,6-tert-butyl-4-methylphenol, or tetra{β-(3,5-tert-butyl-4-hydroxylphenyl)propionic acid}pentaerythritol ester.

The tackifying resin is one or more selected from the group consisting of polyethylene-vinyl acetate copolymer, hydroxyl-terminated thermoplastic polyester and hydrogenated rosin resin.

The flame retardant specifically comprises, based on mass percent, from 30% to 70% of polypropylene having a melt index of from 0.5 to 15.0 g/10 min, from 5% to 25% of polyethylene having a melt index of from 0.01 to 2.0 g/10 min, from 20% to 30% of at least one inorganic filler selected from the group consisting of powdery talc, kaolinite, sericite, silicon dioxide and diatomite, from 5% to 15% of an organic flame retardant halide selected from decabromodiphenyl ether, dodecachloro-dodecahydro-dimethanooxacillin cyclooctenyl or mixtures thereof The flexibilizer is selected from polyolefin flexibilizers, and formed by mixing and extruding polyethylene elastomer, linear polyethylene, polypropylene(PP) and an anti-aging agent. The mass percents of the materials are: polyethylene elastomer: 31%, linear polyethylene: 19%, polypropylene(PP): 49% and anti-aging agent: 1%.

The specific preparation process of the aforesaid hot melt adhesive is as follows.

(1) placing from 60 to 70 parts by weight of polyester polyol, from 3 to 5 parts by weight of polyether polyol, from 1.5 to 1.8 parts by weight of an antioxidant and from 4 to 6 parts by weight of a tackifying agent in a reaction kettle, heating to a temperature of from 120 to 140° C., vacuum dehydrating for 1.5 to 2 h while stirring and mixing, wherein the vacuum degree is less than 0.05 MPa, then cooling to a temperature of from 70 to 75° C.;

(2) adding from 15 to 20 parts by weight diisocyanate and from 0.8 to 1.5 parts by weight of a catalyst to the reaction product in step (1) under nitrogen protection, and reacting at a temperature of from 85 to 95° C. for 1 to 1.5 h;

(3) adding from 0.5 to 1.2 parts by weight of a chain extender, from 2 to 4 parts by weight of a flame retardant, from 2 to 4 parts by weight of a flexibilizer to the reaction product in step (2) under nitrogen protection, stirring and reacting at 75 to 85° C. for 45 min to 1 h;

(4) discharging under the protection condition of feeding nitrogen, aging for a certain time to form hot melt adhesive material of the present invention, feeding into the extruder, extruding via the extruder die head and flow casting to the release paper, as shown in FIG. 2.

The TPU material for molding TPU film in the present invention comprises from 60 to 70 parts by weight of polymer polyol which is one or more selected from polytetrahydrofuranether diol having a molecular weight of 1000 and/or polybutylene terephthalate polyol having a molecular weight of 3000, from 30 to 35 parts by weight of 1,4-cyclohexane diisocyanate, from 4 to 9 parts by weight of an extender which is 1,4-butanediol chain, from 3 to 5 parts by weight of a hydrolytic resistant agent which is specifically carbodiimide-like hydrolytic resistant agent and from 1 to 3 parts by weight of a flame retardant which is an organic halide flame retardant having an average particle size of less than or equal to 4 μm and formed by mixing decabromodiphenyl ethane with trace calcined silicon dioxide, from 1 to 2 parts by weight of a wear-resistant agent consisting of aromatic silicone oil, from 0.2 to 0.8 part by weight of an antioxidant which is at least one selected from the group consisting of β-(4-hydroxyl-3,5-di-t-butylphenyl)-propionic acid N-octadecanol ester, tetra{β-(3,5-di-butyl-4-hydroxylphenyl)propionic acid}-pentaerythritol ester and di-[(2,4-di-t-butyl-phenyl) phosphorous acid] pentaerythritol ester, from 0.1 to 0.5 part by weight of a hindered amine light stabilizer which is specifically di-(2,2,6,6-tetramethyl-4-piperidyl) sebacate light stabilizer, from 0.2 to 0.6 part by weight of benzotriazole-like ultraviolet light absorber, from 0.4 to 0.8 part by weight of montan wax and/or erucamide wax lubricant, from 1 to 3 parts by weight of a matting agent consisting of calcium filler and from 0.5 to 1.2 part by weight of an antistatic agent consisting of metal powder or conductive carbon black, and from 0.05 to 0.2 part by weight of a titanium catalyst or a bismuth catalyst.

The thermoplastic polyurethane elastomer TPU for molding film is prepared from the aforesaid materials by the following specific method.

(1) placing the polymer polyol in the aforesaid parts by weight into a reaction kettle, and heating to a temperature of from 80 to 90° C., then adding the antioxidant, hindered amine light stabilizer, benzotriazole-like ultraviolet light absorber, lubricant and hydrolytic resistant agent in the aforesaid respective parts by weight, sufficiently stirring to obtain a polymer polyol mixed solution;

(2) adding 1,4-cyclohexane diisocyanate having a temperature of from 55 to 65° C. and being in the aforesaid parts by weight into the polymer polyol mixed solution, stirring and mixing to obtain a primary reaction mixture;

(3) keeping the temperature of said reaction mixture, adding 1,4-butanediol chain extender in the aforesaid parts by weight and the catalysts, controlling the temperature to be from 150 to 210° C. and the pressure to be from 4 to 8 MPa, and reacting for about 1 h;

(4) when the reaction melt reaches to a temperature between 180 to 210° C., adding the flame retardant, wear-resistant agent, matting agent and antistatic agent in the aforesaid respective parts by weight, reacting for a predetermined period of time, dehydrating, drying and aging to obtain thermoplastic polyurethane elastomer material;

The device applied for preparing the aforesaid thermoplastic polyurethane elastomer material may be single screw mixing device, synthetic twin-screw continuous reaction extruder, drying device and the like well-known in the art. The prepared thermoplastic polyurethane elastomer material is re-fed into the extruder for extruding TPU film, and bonded together with the rolled hot melt adhesive film by the aforesaid method, so as to obtain the sewing-free hot melt adhesive leather of the present invention.

Finally, tests were made for the main performances of the sewing-free hot melt adhesive TPU leather of the present invention prepared by the aforesaid method, and the results are as follows.

1. Hardness: 75~80/A;
2. Tensile strength: 28.2 kgf horizontally, 25.3 kgf longitudinally
3. Tear strength: 5.0 kgf waft-wise; 4.7 kgf weft-wise;
4. wear strength: No wear phenomenon after grinding 500 turns at a pressure of 9 Kpa;
5. Bonding strength: ≥2.5 Kg/25 mm;
6. Elongation rate: ≥700%;
7. Shore D Hardness: ≥95.

The following is the comparison of main performances to the same type.

| Performance | TPU | PVC | Butyronitrile rubber | Chloroprene rubber | Natural Rubber |
|---|---|---|---|---|---|
| Hardness(Shore) | 95 | 87 | 78 | 70 | 77 |
| Tensile strength | 28.2, 25.3 | 16, 14.3 | 11.6 | 10.3 | 16.3 |
| Elongation rate/% | 700 | 309 | 400 | 400 | 574 |

The sewing-free hot melt adhesive TPU leather of the present invention is prepared via creative formula and by making release paper, hot melt adhesive and TPU film, especially by bonding the polyurethane hot melt adhesive having a special formula to TPU film, so as to greatly increase the tensile strength, tear strength, wear strength, bonding strength and surface glossiness of the final leather product. Even at a high temperature of 190° C., qualitative change will not take place for the final leather product. The final leather product can be widely used in production industries, such as clothing manufacture, shoemaking, handbags, bags and suitcases, seats, and architectural ornament. Moreover, the world's first "novel sewing-free hot melt adhesive TPU leather" provided by the present company in combination with the long-term innovative practice has not been reported at home and abroad.

Example 1

The following is one preferred embodiment of the present invention.

The sewing-free hot melt adhesive TPU leather of the present invention is prepared by the following way.

I. Preparing a Release Paper choosing a bottom paper layer A1, coating a water-based polypropylene adhesive layer A2 having a thickness of 2.5 μm onto the bottom paper layer A1, then adhering a plastic layer A3 having a thickness of 20 μm onto the adhesive layer A2 and curing for a period of time; adding 65 parts by weight of inorganic particles, 35 parts by weight of silicone acrylic emulsion, 4 parts by weight of sodium fatty acid methyl ester sulfonate, 3 parts by weight of dodecyl benzyl dimethyl ammonium chloride and 50 parts by weight of water to prepare a transition layer coating liquid, homogeneously coating the transition layer coating solution on the plastic layer A3 with a scraper, curing and press-polishing into a transition layer A4 having a thickness of 15 μm, and finally extruding on the transition layer A4 a release layer A5 having a coating thickness of 25 μm, wherein the release layer comprises 60 parts by weight of polypropylene, 30 parts by weight of poly-4-methyl-1-pentylene, 8 parts by weight of vinyl silicone oil, 1.5 parts by weight of 2,2'-methylene-bis-(4,6-di-tertiary-butylphenoxy)sodium phosphate and 0.5 part by weight of butyl peroxybenzoate, wherein the vinyl silicone oil has the following structural formula:

wherein $R_1$ and $R_3$ are —$CH_3$, and $R_2$ is —CH=$CH_2$; m=2500; and n=4, so as to prepare and obtain the release paper as the leather base material of the present invention.

II. Preparing Polyurethane Hot Melt Adhesive Material (1) placing 65 parts by weight of polyester polyol, 4 parts by weight of polyether polyol, 1.6 parts by weight of an antioxidant and 5 parts by weight of a tackifying agent in a reaction kettle, heating to a temperature of 120° C., vacuum dehydrating for 1.5 h while stirring and mixing, wherein the vacuum degree is less than 0.05 MPa, then cooling to a temperature of 70° C., (2) adding 18 parts by weight of diisocyanate and 1 part by weight of a catalyst to the reaction product in step (1) under nitrogen protection, and reacting at a temperature of 85° C. for 1.5 h;

(3) adding 1 part by weight of a chain extender, 3 parts by weight of a flame retardant, 3 parts by weight of a flexibilizer to the reaction product in step (2) under nitrogen protection, stirring and reacting at 85° C. for 1 h;

(4) discharging under the protection condition of feeding nitrogen, aging for a period of time to form hot melt adhesive material;

wherein the polyester polyol is polycondensed at 180-240° C. via aliphatic diol having a low molecular weight and aliphatic dicarboxylic acid and aromatic dicarboxylic acid to prepare hydroxyl-terminated polyester diol; the aliphatic dicarboxylic acid is selected from the group consisting of adipic acid and fumaric acid; the aromatic dicarboxylic acid is selected from the group consisting of phthalic acid and terephthalic acid; the aliphatic diol is selected from the group consisting of glycol, 1,3-butanediol, 1,5-pentadiol or dodecyl hexandiol; the diisocyanate is 4,4'-diphenylmethane diisocyanate; the polyether polyol is polytetrahydrofuranether diol; the catalyst is dimorpholinodiethylether; the chain extender is 1,6-hexanediol; the antioxidant is tetra{β-(3,5-tert-butyl-4-hydroxylphenyl)propionic acid} pentaerythritol ester; the tackifying resin is hydrogenated rosin resin; the flame retardant comprises 50 wt. % of polypropylene having a melt index of 5 g/10 min, 20 wt. % of polyethylene having a melt index of 0.8 g/10 min, 20 wt. % of an inorganic filler consisting of powdery talc and kaolinite, 10 wt. % of an organic halide flame retardant of a mixture of decabromodiphenyl ether and dodecachloro-dodecahydro-dimethanooxacillin cyclooctenyl; the flexibilizer is a polyolefin flexibilizer formed by mixing and extruding 31% of polyethylene elastomers, 19% of linear polyethylene, 49% of polypropylene and 1% of anti-aging agent materials;

III. Preparing TPU Material (1) placing 65 parts by weight of polybutylene terephthalate polyol having a molecular weight of 3000 into a reaction kettle, and heating to a temperature of 90° C., adding 0.6 part by weight of β-(4-hydroxyl-3,5-di-t-butylphenyl)-propionic acid N-octadecanol ester antioxidant, 0.3 part by weight of di-(2,2,6,6-tetramethyl-4-piperidyl) sebacate light stabilizer, 0.4 part by weight of benzotriazole-like ultraviolet light absorber, 0.6 part by weight of erucamide wax lubricant, 4 parts by weight of carbodiimide-like hydrolytic resistant agent, sufficiently stirring to obtain a polymer polyol mixed solution;

(2) adding 32 parts by weight of 1,4-cyclohexane diisocyanate having a temperature of 60° C. into the polymer polyol mixed solution, stirring and mixing to obtain a primary reaction mixture;

(3) keeping the temperature of said reaction mixture, adding 6 parts by weight of 1,4-butanediol chain extender and 0.1 part by weight of a bismuth catalyst, controlling the temperature to be from 180 to 210° C. and the pressure to be 6 MPa, and reacting for about 1 h;

(4) when the reaction melt reaches to a temperature of 200° C., adding 2 parts by weight of an organic halide flame retardant formed by mixing decabromodiphenyl ethane with trace calcined silicon dioxide, 1.5 parts by weight of a wear-resistant agent consisting of aromatic silicone oil, 2 parts by weight of a matting agent consisting of calcium filler and 0.8 part by weight of an antistatic agent consisting of conductive carbon black, dehydrating, drying and aging after reacting for a determined period of time to obtain thermoplastic polyurethane elastomer material;

IV. Joint-Preparing Sewing-Free Hot Melt Adhesive TPU Leather (1) preparing the release paper, hot melt adhesive material and TPU material prepared by the aforesaid steps and spreading out the release paper in relevant devices;

(2) extruding the hot melt adhesive material prepared via an extruder into sizing material, feeding the sizing material into an extruder at 150° C. and melting into a pasty form, extruding via the extruder die head and flow casting to the release paper, pressing via the counter roller, cooling and reeling to form a hot melt adhesive film as shown in FIG. 1;

(3) extruding the TPU material prepared into TPU film, placing the volumed hot melt adhesive film in step (2) onto two feeding racks respectively, feeding the hot melt adhesive film and TPU film simultaneously into an upper and lower counter pressure rollers which are thermostatic for counter pressing, wherein the counter pressure rollers have a temperature of more than 160° C., so as to make the hot melt adhesive having a low melting point instantaneously bond to the TPU film into a whole one in the counter pressing of the upper and lower counter pressure rollers, and then be cooled and molded to the sewing-free hot melt adhesive TPU leather of the present invention as shown in FIG. 2.

The aforesaid merely describes the preferred embodiments of the present invention, but the technical solution of the present invention is not limited within such scope. Any well-known transformation made by those skilled in the art on the basis of the main technical concept of the present invention falls within the scope of the technical category of the present invention. The specific protection scope of the present invention shall be based on the claims.

The invention claimed is:

1. A sewing-free hot melt adhesive thermoplastic polyurethane (TPU) leather, comprising a release paper, a hot melt adhesive film coated on the release paper, and a TPU film adhered to the hot melt adhesive film, wherein the release paper comprises a bottom paper layer, an adhesive layer, a plastic layer, a transition layer and a release layer; the plastic layer is adhered to the bottom paper layer via the adhesive layer; the transition layer is placed on the plastic layer; the release layer is placed on the transition layer; the adhesive layer is a water-based polypropylene coating layer having an application amount of 5-8 g per square meter and a thickness of 0.8-4 µm; the plastic layer is a polyethylene terephthalate film having a thickness of 18-25 µm; the transition layer is prepared by mixing and stirring from 62 to 68 parts by weight of inorganic particles, from 32 to 36 parts by weight of silicone acrylic emulsion, from 3 to 5 parts by weight of sodium fatty acid methyl ester sulfonate, from 2 to 4 parts by weight of dodecyl benzyl dimethyl ammonium chloride, from 45 to 55 parts by weight of water, and has a film formation thickness of 15-20 µm; the release layer has a thickness of 20-25 µm and is prepared by mixing and stirring from 58 to 65 parts by weight of polypropylene, from 26 to 34 parts by weight of poly(4-methyl-1-pentene), from 6 to 9 parts by weight of vinyl silicone oil, from 1 to 2 parts by weight of 2,2'-methylene-bi-(4,6-di-tertiary-butyl-phenoxy) sodium phosphate and from 0.1 to 0.8 part by weight of tert-butyl peroxy benzoate;

wherein the hot melt adhesive material for forming the hot melt adhesive film is prepared by from 60 to 70 parts by weight of hydroxyl-terminated polyester diol, from 15 to 20 parts by weight of diisocyanate, from 3 to 5 parts by weight of polyether polyol, from 0.8 to 1.5 parts by weight of a catalyst, from 0.5 to 1.2 parts by weight of a chain extender, from 1.5 to 1.8 parts by weight of an antioxidant, from 4 to 6 parts by weight of a tackifying resin, from 2 to 4 parts by weight of a flame retardant, and from 2 to 4 parts by weight of a flexibilizer; the hydroxyl-terminated polyester diol is prepared by polycondensing an aliphatic diol and an aliphatic dicarboxylic acid and an aromatic dicarboxylic acid at 100-260° C., and the hydroxyl-terminated polyester diol has a molecular weight of from 2000 to 6000; the aliphatic dicarboxylic acid is selected from the group consisting of adipic acid, fumaric acid, maleic acid or octanedioic acid; the aromatic dicarboxylic acid is selected from the group consisting of phthalic acid, terephthalic acid or m-phthalic acid; the aliphatic diol is selected from the group consisting of glycol, diglycol, propanediol, methyl propanediol, 1,4-butanediol, 1,6-hexanediol, 1,3-butanediol, 1,5-pentadiol or dodecyl hexandiol; the diisocyanate is selected from the group consisting of 4,4'-diphenylmethane diisocyanate or 1,6-hexamethylene diisocyanate; the polyether polyol is polytetrahydrofuranether diol; the catalyst is one or more selected from the group consisting of dibutyltin dilaurate, triethanolamine or dimorpholinodiethylether; the chain extender is selected from the group consisting of 1,6-hexanediol, methyl propanediol or 1,4-butanediol; the antioxidant is selected from the group consisting of 2,6-tert-butyl-4-methylphenol, or tetra{β-(3,5-tert-butyl-4-hydroxyl-phenyl)propionic acid}pentaerythritol ester; the tackifying resin is one or more selected from the group consisting of polyethylene-vinyl acetate copolymer, hydroxyl-terminated thermoplastic polyester and hydrogenated rosin resin; the flame retardant comprises, based on mass percent, from 30% to 70% of polypropylene having a melt index of from 0.5 to 15.0 g/10 min, from 5% to 25% of polyethylene having a melt index of from 0.01 to 2.0 g/10 min, from 20% to 40% of at least one inorganic filler selected from the group consisting of powdery talc, kaolinite, sericite, silicon dioxide and diatomite, from 5% to 35% of an organic halide of decabromodiphenyl ether; the flexibilizer is formed by mixing and extruding polyethylene elastomer, linear polyethylene, polypropylene and anti-aging agent materials;

wherein the TPU material for preparing the TPU film comprises from 60 to 70 parts by weight of polymer polyol which is one or more selected from polytetrahydrofuranether diol having a molecular weight of 1000 and polybutylene terephthalate polyol having a molecular weight of 3000, from 30 to 35 parts by weight of 1,4-cyclohexane diisocyanate, from 4 to 9 parts by weight of a chain extender which is 1,4-butanediol, from 3 to 5 parts by weight of a carbodi-imide-hydrolytic resistant agent, from 1 to 3 parts by weight of an organic halide flame retardant prepared by mixing decabromodiphenyl ethane having an average particle size of less than or equal to 4 µm with trace calcined silicon dioxide, from 1 to 2 parts by weight of a wear-resistant agent consisting of aromatic silicone oil, from 0.2 to 0.8 part by weight of an antioxidant which is at least one selected from the group consisting of β-(4-hydroxyl-3,5-di-t-butylphenyl)propionic acid N-octadecanol ester, tetra{β-(3,5-tert-butyl-4-hydroxylphenyl)propionic acid}pentaerythritol ester and di-[(2,4-di-t-butyl-phenyl) phosphorous acid] pentaerythritol ester, from 0.1 to 0.5 part by weight of di-(2,2,6,6-tetramethyl-4-piperidyl) sebacate hindered amine-light stabilizer, from 0.2 to 0.6 part by weight of benzotriazole-ultraviolet light absorber, from 0.4 to 0.8 part by weight of montan wax and/or erucamide wax lubricant, from 1 to 3 parts by weight of a matting agent consisting of calcium filler, from 0.5 to 1.2 parts by weight of an antistatic agent consisting of metal powder and conductive carbon black, and from 0.05 to 0.2 part by weight of a titanium catalyst or a bismuth catalyst.

2. The sewing-free hot melt adhesive TPU leather according to claim 1, wherein the inorganic particles in the transition layer of the release paper comprise clay having a particle size of 0.5 to 0.8 µm and are included in an amount of 25% of the whole amount of inorganic particles, barium sulfate powder having a particle size of 1 to 2 µm and included in an amount of 60% of the whole amount of inorganic particles, and calcium carbonate powder having a particle size of 3 to 5 µm and included in an amount of 15% of the whole amount of inorganic particles, wherein vinyl silicone oil in the release layer has the following structural formula:

wherein $R_1$ and $R_3$ are $-CH_3$; $R_2$ is $-CH=CH_2$; m ranges from 2000 to 3000; and n ranges from 3 to 6.

3. The sewing-free hot melt adhesive TPU leather according to claim 1, wherein the adhesive layer has a thickness of 2.5 µm; the plastic layer has a thickness of 20 µm; the transition layer has a thickness of 15 µm; the release layer has a thickness of 25 µm, wherein the transition layer is prepared from 65 parts by weight of inorganic particles, 35 parts by weight of silicone acrylic emulsion, 4 parts by weight of sodium fatty acid methyl ester sulfonate, 3 parts by weight of dodecyl benzyl dimethyl ammonium chloride, and 50 parts by weight of water; the release layer is prepared from 60 parts by weight of polypropylene, 30 parts by weight of poly(4-methyl-1-pentene), 8 parts by weight of vinyl silicone oil, 1.5 parts by weight of 2,2'-methylene-bi-(4,6-di-tertiary-butylphenoxy) sodium phosphate and 0.5 part by weight of tert-butyl peroxy benzoate, wherein the vinyl silicone oil has the following structural formula:

wherein $R_1$ and $R_3$ are —$CH_3$; $R_2$ is —$CH=CH_2$; m=2500; and n=4.

4. The sewing-free hot melt adhesive TPU leather according to claim 1, wherein the TPU material comprises 65 parts by weight of polybutylene terephthalate polyol having a molecular weight of 3000, 0.6 part by weight of β-(4-hydroxyl-3,5-di-t-butylphenyl)-propionic acid N-octadecanol ester antioxidant, 0.3 part by weight of di-(2,2,6,6-tetramethyl-4-piperidyl) sebacate light stabilizer, 0.4 part by weight of benzotriazole ultraviolet light absorber, 0.6 part by weight of erucamide wax lubricant, 4 parts by weight of carbodiimide hydrolytic resistant agent, 32 parts by weight of 1,4-cyclohexane diisocyanate at a temperature of 60° C., 6 parts by weight of 1,4-butanediol chain extender, 0.1 part by weight of a bismuth catalyst, 2 parts by weight of an organic halide flame retardant prepared by mixing decabromodiphenyl ethane with trace calcined silicon dioxide, 1.5 parts by weight of a wear-resistant agent consisting of aromatic silicone oil, 2 parts by weight of a matting agent consisting of calcium filler and 0.8 part by weight of an antistatic agent consisting of conductive carbon black.

5. The sewing-free hot melt adhesive TPU leather according to claim 1, wherein the hot melt adhesive TPU leather has a tensile strength of 28.2 Kgf horizontally and 25.3 Kgf longitudinally, a tear strength of 5.0 Kgf warp-wise and 4.7 Kgf weft-wise, a bonding strength of greater than or equal to 2.5 Kg/25 mm, an elongation rate of greater than or equal to 700%, and a Shore D hardness of greater than or equal to 95.

6. A method for preparing a sewing-free hot melt adhesive thermoplastic polyurethane (TPU) leather comprising the following steps:

I. preparing a release paper comprising:
(1) choosing a bottom paper layer (A1), coating a water-based polypropylene adhesive layer (A2) having a thickness of 0.8-4 μm onto the bottom paper layer (A1), then adhering a plastic layer (A3) having a thickness of 18-25 μm and formed from polyethylene terephthalate film to the adhesive layer (A2), and then curing;
(2) adding from 3 to 5 parts by weight of sodium fatty acid methyl ester sulfonate into from 45 to 55 parts by weight of water, stirring homogeneously, then adding from 62 to 68 parts by weight of inorganic particles formed by mixing clay, barium sulfate powder and calcium carbonate powder, stirring at a high-speed rate to disperse them homogeneously, then adding from 32 to 36 parts by weight of silicone acrylic emulsion into the dispersed slurry, homogeneously mixing with a glass rod, and then adding from 2 to 4 parts by weight of dodecyl benzyl dimethyl ammonium chloride, continuing to homogeneously stir to form a transition layer coating liquid;

(3) homogeneously coating the transition layer coating solution on the plastic layer (A3) with a scraper, heating at 80° C. for 30 seconds and curing to form a film, controlling the thickness of the film to be from 15 to 20 press-polishing the film-formed transition layer (A4) at 120° C., a linear pressure of 150 KN/m and a speed of 10 m/min;
(4) homogeneously mixing from 58-65 parts by weight of polypropylene, from 26-34 parts by weight of poly(4-methyl-1-pentylene) and from 6 to 9 parts by weight of vinyl silicone oil, heating to a temperature of 90° C., keeping the temperature for 2 hours, adding from 1 to 2 parts by weight of 2,2'-methylene-bis-(4,6-di-tertiary-butylphenoxy)sodium phosphate and from 0.1 to 0.8 part by weight of butyl peroxybenzoate, homogeneously mixing, extruding via an extruder and coating onto the surface of the transition layer (A4) to form a release layer (A5), controlling the thickness thereof to be from 20 to 25 μm;

II. preparing hot melt adhesive material comprising:
(1) placing from 60 to 70 parts by weight of hydroxyl-terminated polyester diol, from 3 to 5 parts by weight of polyether polyol, from 1.5 to 1.8 parts by weight of an antioxidant and from 4 to 6 parts by weight of a tackifying agent in a reaction kettle, heating to a temperature of from 120 to 140° C., vacuum dehydrating for 1.5 to 2 h while stirring and mixing, wherein the vacuum degree is less than 0.05 MPa, then cooling to a temperature of from 70 to 75° C., wherein the hydroxyl-terminated polyester diol is prepared by polycondensing an aliphatic diol having a low molecular weight and an aliphatic dicarboxylic acid and an aromatic dicarboxylic acid at 100-260° C., wherein the aliphatic diol of low molecular weight is selected from the group consisting of glycols, diglycols, propanediol, methyl propanediol, 1,4-butanediol, 1,6-hexanediol, 1,3-butanediol, 1,5-pentanediol, and dodecyl-hexanediol, and the hydroxyl-terminated polyester diol has a molecular weight of from 2000 to 6000; the polyether polyol is polytetrahydrofuranether diol; the antioxidant is selected from the group consisting of 2,6-tert-butyl-4-methylphenol, or tetra{β-(3,5-tert-butyl-4-hydroxylphenyl)-propionic acid}penta-erythritol ester; the tackifying resin is one or more selected from the group consisting of polyethylene-vinyl acetate copolymer, hydroxyl-terminated thermoplastic polyester and hydrogenated rosin resin;
(2) adding from 15 to 20 parts by weight of diisocyanate and from 0.8 to 1.5 parts by weight of a catalyst to the reaction product in step (1) under nitrogen protection, and reacting at a temperature of from 85 to 95° C. for 1 to 1.5 h, wherein said diisocyanate is either of 4,4'-diphenylmethane diisocyanate or 1,6-hexamethylene diisocyanate; the catalyst is one or more selected from the group consisting of dibutyltin dilaurate, triethanolamine and dimorpholinodiethylether;
(3) adding from 0.5 to 1.2 parts by weight of a chain extender, from 2 to 4 parts by weight of a flame retardant, from 2 to 4 parts by weight of a flexibilizer to the reaction product in step (2) under nitrogen protection, stirring and reacting at 75 to 85° C. for 45 min to 1 h, wherein the chain extender is one selected form the group consisting of 1,6-hexanediol, methylpropanediol and 1,4-butanediol; the flame retardant comprises from 30 wt. % to 70 wt. % of polypropylene having a melt index of from 0.5 to 15.0 g/10 min, from 5 wt. % to 25 wt. % of polyethylene having a melt index of 0.01 to 2.0 g/10 min, from 20 wt. % to 40 wt. % of at least an inorganic filler selected from powdery talc, kaolinite, sericite, silicon dioxide and diatomite, and from 5 wt. % to 35 wt. % of organic halide of decabromodiphenyl ether; the flexibilizer is selected from polyolefin flexibilizer;

(4) discharging under the protection condition of feeding nitrogen, aging, cooling to form hot melt adhesive material;

III. preparing TPU material comprising:

(1) placing from 60 to 70 parts by weight of polymer polyol into a reaction kettle, and heating to a temperature of from 80 to 90° C., wherein the polymer polyol is polytetrahydrofuranether diol having a molecular weight of 1000 and/or polybutylene terephthalate polyol having a molecular weight of 3000, then adding from 0.2 to 0.8 part by weight of an antioxidant, from 0.1 to 0.5 part by weight of di-(2,2,6,6-tetramethyl-4-piperidyl) sebacate light stabilizer, from 0.2 to 0.6 part by weight of benzotriazole ultraviolet light absorber, from 0.4 to 0.8 part by weight of montan wax and/or erucamide wax lubricant, from 3 to 5 parts by weight of carbodiimide-hydrolytic resistant agent, sufficiently stirring to obtain a polymer polyol mixed solution, wherein the antioxidant is at least one selected from the group consisting of β-(4-hydroxyl-3,5-di-t-butylphenyl)-propionic acid N-octadecanol ester, tetra{β-(3,5-di-butyl-4-hydroxylphenyl)propionic acid}-pentaerythritol ester and di-[(2,4-di-t-butyl-phenyl) phosphorous acid] pentaerythritol ester;

(2) adding from 30 to 35 parts by weight of 1,4-cyclohexane diisocyanate having a temperature of from 55 to 65° C. into the polymer polyol mixed solution, stirring and mixing to obtain a primary reaction mixture;

(3) keeping the temperature of said reaction mixture, adding from 4 to 9 parts by weight of 1,4-butanediol chain extender and from 0.05 to 0.2 part by weight of a titanium catalyst or a bismuth catalyst, controlling the temperature to be from 150 to 210° C. and the pressure to be from 4 to 8 MPa, and reacting for about 1 h;

(4) when the reaction melt reaches to a temperature between 180 to 210° C., adding from 1 to 3 parts by weight of an organic halide flame retardant having an average particle size of less than or equal to 4 μm, formed by mixing decabromodiphenyl ethane with trace calcined silicon dioxide, from 1 to 2 parts by weight of a wear-resistant agent consisting of aromatic silicone oil, from 1 to 3 parts by weight of a matting agent consisting of calcium filler and from 0.5 to 1.2 part by weight of an antistatic agent consisting of metal powder or conductive carbon black, dehydrating, drying and aging after reaction to obtain thermoplastic polyurethane elastomer material;

IV. joint-preparing sewing-free hot melt adhesive TPU leather comprising:

(1) providing the release paper, hot melt adhesive material and TPU material prepared by the aforesaid steps and spreading out the release paper in relevant devices;

(2) extruding the hot melt adhesive material prepared in step II via an extruder into sizing material, feeding the sizing material into an extruder at 150° C. and melting into a pasty form, extruding via the extruder die head and flow casting to the release paper, pressing via the counter roller, cooling and reeling to form a hot melt adhesive film;

(3) extruding the TPU material prepared in step III into TPU film, placing the hot melt adhesive film onto two feeding racks respectively, feeding the hot melt adhesive film and TPU film simultaneously into an upper and lower counter pressure rollers which are thermostatic for counter pressing, wherein the counter pressure rollers have a temperature of more than 160° C., so as to make the hot melt adhesive having a low melting point instantaneously bond to the TPU film into an integral unit in the counter pressing of the upper and lower counter pressure rollers, and then be cooled and formed onto the sewing-free hot melt adhesive TPU leather.

7. The method for preparing a sewing-free hot melt adhesive TPU leather according to claim 6, where, in the step I for preparing the release paper, the transition layer is prepared from 65 parts by weight of inorganic particles, 35 parts by weight of silicone acrylic emulsion, 4 parts by weight of sodium fatty acid methyl ester sulfonate, 3 parts by weight of dodecyl benzyl dimethyl ammonium chloride and 50 parts by weight of water; the inorganic particles comprise 25% of clay having a particle size of 0.5 to 0.8 μm, 60% of barium sulfate powder having a particle size of 1 to 2 μm, and 15% of calcium carbonate powder having a particle size of 3 to 5 μm; the release layer is prepared from 60 parts by weight of polypropylene, 30 parts by weight of poly-4-methyl-1-pentylene, 8 parts by weight of vinyl silicone oil, 1.5 parts by weight of 2,2'-methylene-bis-(4,6-ditertiary-butylphenoxy)sodium phosphate and 0.5 part by weight of butyl peroxybenzoate, wherein the vinyl silicone oil has the following structural formula:

wherein $R_1$ and $R_3$ are —$CH_3$, and $R_2$ is —$CH\!=\!CH_2$; m=2500; and n=4.

8. The method for preparing a sewing-free hot melt adhesive TPU leather according to claim 6, wherein the aliphatic dicarboxylic acid for preparing hydroxyl-terminated polyester diol in step II is selected from the group consisting of adipic acid, fumaric acid, maleic acid or octanedioic acid; the aromatic dicarboxylic acid is selected from the group consisting of phthalic acid, terephthalic acid or m-phthalic acid; the aliphatic diol having a low molecular weight is selected from the group consisting of glycol, diglycol, propanediol, methyl propanediol, 1,4-butanediol, 1,6-hexanediol, 1,3-butanediol, 1,5-pentadiol or dodecyl glycol; the flexibilizer is formed by mixing and extruding polyethylene elastomer, linear polyethylene, polypropylene and anti-aging agent materials, the mass percents of the materials are: polyethylene elastomer: 31%, linear polyethylene: 19%, polypropylene: 49% and anti-aging agent: 1%.

9. The method for preparing a sewing-free hot melt adhesive TPU leather according to claim 6, wherein the TPU material in said step III comprises 65 parts by weight of polybutylene terephthalate polyol having a molecular weight of 3000, 0.6 part by weight of β-(4-hydroxyl-3,5-di-t-butylphenyl)-propionic acid N-octadecanol ester antioxidant, 0.3 part by weight of di-(2,2,6,6-tetramethyl-4-piperidyl) sebacate light stabilizer, 0.4 part by weight of benzotriazole-ultraviolet light absorber, 0.6 part by weight of erucamide wax lubricant, 4 parts by weight of carbodiimide-hydrolytic resistant agent, 32 parts by weight of 1,4-cyclohexane diisocyanate at a temperature of 60° C., 6 parts by weight of 1,4-butanediol chain extender, 0.1 part by weight of a bismuth catalyst, 2 parts by weight of an organic halide flame retardant prepared by mixing decabromodiphenyl ethane with trace calcined silicon dioxide, 1.5 parts by weight of a wear-resistant agent consisting of aromatic silicone oil, 2 parts by weight of a matting agent consisting of calcium filler and 0.8 part by weight of an antistatic agent consisting of conductive carbon black.

10. The sewing-free hot melt adhesive TPU leather according to claim 2, wherein the adhesive layer has a thickness of 2.5 μm; the plastic layer has a thickness of 20 μm; the transition layer has a thickness of 15 μm; the release layer has a thickness of 25 μm, wherein the transition layer is prepared from 65 parts by weight of inorganic particles, 35 parts by weight of silicone acrylic emulsion, 4 parts by weight of sodium fatty acid methyl ester sulfonate, 3 parts by weight of dodecyl benzyl dimethyl ammonium chloride, and 50 parts by weight of water; the release layer is prepared from 60 parts by weight of polypropylene, 30 parts by weight of poly(4-methyl-1-pentene), 8 parts by weight of vinyl silicone oil, 1.5 parts by weight of 2,2'-methylene-bi-(4,6-di-tertiary-butylphenoxy) sodium phosphate and 0.5 part by weight of tert-butyl peroxy benzoate, wherein the vinyl silicone oil has the following structural formula, wherein $R_1$ and $R_3$ are —$CH_3$; $R_2$ is —CH=$CH_2$; m=2500; and n=4.

11. The sewing-free hot melt adhesive TPU leather according to claim 2, wherein the hot melt adhesive TPU leather has a tensile strength of 28.2 Kgf horizontally and 25.3 Kgf longitudinally, a tear strength of 5.0 Kgf warp-wise and 4.7 Kgf weft-wise, a bonding strength of greater than or equal to 2.5 Kg/25 mm, an elongation rate of greater than or equal to 700%, and a Shore D hardness of greater than or equal to 95.

12. The sewing-free hot melt adhesive TPU leather according to claim 3, wherein the hot melt adhesive TPU leather has a tensile strength of 28.2 Kgf horizontally and 25.3 Kgf longitudinally, a tear strength of 5.0 Kgf warp-wise and 4.7 Kgf weft-wise, a bonding strength of greater than or equal to 2.5 Kg/25 mm, an elongation rate of greater than or equal to 700%, and a Shore D hardness of greater than or equal to 95.

13. The sewing-free hot melt adhesive TPU leather according to claim 1, wherein the hot melt adhesive TPU leather has a tensile strength of 28.2 Kgf horizontally and 25.3 Kgf longitudinally, a tear strength of 5.0 Kgf warp-wise and 4.7 Kgf weft-wise, a bonding strength of greater than or equal to 2.5 Kg/25 mm, an elongation rate of greater than or equal to 700%, and a Shore D hardness of greater than or equal to 95.

14. The sewing-free hot melt adhesive TPU leather according to claim 4, wherein the hot melt adhesive TPU leather has a tensile strength of 28.2 Kgf horizontally and 25.3 Kgf longitudinally, a tear strength of 5.0 Kgf warp-wise and 4.7 Kgf weft-wise, a bonding strength of greater than or equal to 2.5 Kg/25 mm, an elongation rate of greater than or equal to 700%, and a Shore D hardness of greater than or equal to 95.

* * * * *